INVENTORS
GEERT RÖSLER
UWE W. RISCHE
BY
Frank R. ...
AGENT

United States Patent Office 3,315,186
Patented Apr. 18, 1967

3,315,186
WAVE GUIDE JOINT HAVING NON-CONDUCTIVE GAP BETWEEN SECTIONS
Geert Rösler, Hamburg, and Uwe-Wolfgang Rische, Hamburg-Bergedorf, Germany, assignors to North American Philips Company, Inc., New York, N.Y., a corporation of Delaware
Filed May 11, 1965, Ser. No. 454,943
Claims priority, application Germany, July 18, 1964, P 34,707
15 Claims. (Cl. 333—95)

The invention relates to a wave guide which consists of at least two parts, for example, for use in high-frequency heating apparatus, and the parts of which are provided with a readily closable joint.

It is known to pass tape-shaped dielectric material of small thickness, such as tissues, paper and synthetic substances, continuously through the electromagnetic field operative in a wave guide, while the material is heated. It is further known to arrange two or more wave guides beside each other in the travelling direction of the tape-shaped material. In the walls located opposite each other, provision is made of gap-shaped apertures through which a tape-shaped material is passed in order of succession. The wave guides are connected to each other so as to form a zigzag-shaped unit. The tape-shaped material absorbs energy in all the parts of the wave guide bent over in parallel to each other so that the damping of the wave propagating in the hollow wave guide is greater and the material is heated more rapidly.

Such hollow wave guides may be opened and the displaceable part is secured by means of hinges. Contact springs are provided at the closing areas for establishing the required galvanic contact.

Wave guides are further know in which bulky articles such as tablets made of compressed material are heated or which serve for measuring dielectric loss factors and which can be opened at one or more places in order to facilitate the introduction and the removal of the articles. Besides joints by means of screws and flanges, resilient contacts are used which can be attached and detached more rapidly.

In order to avoid less satisfactory joints which result in radiation of energy, the resilient contacts must be constructed with great care. Use is generally made of finger-shaped contact strips and a long-lasting contact joint of each spring must be ensured. Such strips can be manufactured only with difficulty, however, and they must be treated with great care in order to prevent one or more springs from distorting and from establishing insufficient contact. In this case, flash-over occurs, while insufficient contacts give rise to attenuation losses or cause radiation of energy, which may be injurious to the health of the operating staff, especially in case of heating apparatus of higher power.

The fact that such contacts are contaminated in course of time may also result in that connecting areas establish a bad contact. It has been found in practice that when drying foils water vapour is released and is precipitated on the contacts in the form of condensed water. When molding materials, for example, phenol resins, are preheated, other vapours are released which may soon give rise to contamination of the contacts. Also when granular PVC or rubber is heated, a precipitate is formed after some time and this precipitate is more or less harmful in accordance with the contents of the softener, the filler materials etc. Such precipitates may give rise to a contamination of the contacts such that the apparatus is no longer capable of operating or no longer operates completely.

It is an object of this invention to avoid these disadvantages, and the invention is based on the idea of constructing the wave guide so that by the use of a joint without a galvanic contact it is separable transversely of its longitudinal direction and that the plane of interruption is chosen so that a smallest possible number of current lines on the inner side of the wave guide are also interrupted due to the galvanic interruption while the high-frequency field is prevented from emanating from the wave guide and being cut off.

It is very advantageous if, according to the invention, a wave guide consisting of at least two parts, for example, for use in high-frequency heating apparatus, the parts of which can be joined by means of a readily closable joint, is interrupted at least in part at at least one place along a plane the direction of which coincides with the electric field vector of the wave produced in the wave guide and which is at an angle to the wave guide axis which is greater than 0° and smaller than 180°. The relative distance between the parts of the wave guide at the place of this interruption is as small as possible, it should be sufficiently great to avoid flash-over. It has surprisingly been found that no real disturbing losses occur, for example, by radiation or by heating of the joint, so that any loss-incurring damping of the wave guide connected therewith is avoided.

This effect could be accounted for in that the energy is transported mainly by the magnetic and electric fields in the wave guide, in which case the disturbance of the field at the joint in the interruption plane is too small to cause a real loss. This becomes plausible by the fact that an increase of the distance results in a considerable increase of the loss-incurring damping.

A low loss factor involves the requirement that the electric field cannot emanate from the wave guide. Since the plane of interruption lies in the direction of the electric field vector so that no shift current is produced across the plane of interruption, in the circuit arrangement described the electric field cannot emanate if the distance between the parts of the hollow wave guide at the place of interruption is not too great. It has also been found (this will be discussed hereinafter) that the screening effect of the sectional faces of the wall of the hollow guide facing each other is already sufficient in case of the usual wall thickness of hollow wave guides to prevent a considerable radiation of the high-frequency energy. Satisfactory results are thus obtained if at least along part of the circumference of the hollow wave guide the ratio of the size of the wave guide in the interruption plane exceeding its internal dimensions to its internal dimensions is at least 1:50. In an advantageous embodiment of the quick-closing joint, further screening elements are provided at the interruption plane at least along part of the circumference of the hollow wave guide, which elements prevent the high-frequency field from emanating from the internal part of the hollow wave guide. A satisfactory screening effect may be obtained if at least along part of the circumference of the hollow wave guide the ratio of the size of the wave guide in the interruption plane exceeding its internal dimensions to its internal dimensions amounts to approximately 1:3. In an efficacious embodiment, the parts of the hollow wave guide are provided at the interruption place with edge portions bent outwards and at this place provision may be made of flanges at the desired angle to the axis of the hollow wave guide, which yields the advantage that the construction is simple.

It is also possible, however, to provide the screening edges only at that part of the circumference at which the risk of emanation of energy from the hollow wave guide is greatest. In case of a rectangular hollow wave guide, this risk is greatest on the broad sides of the hollow wave guide.

In another embodiment of the hollow wave guide, the screening edge is constituted by a rectangularly bent profiled frame one limb of which is secured to one part of the hollow wave guide while the second limb overlaps the interruption place and partly the other part of the hollow wave guide.

The interruption place in the wall of the hollow wave guide may contain a dielectric other than air which has electrical advantages so that a reduction of the dimensions of the screening elements is possible and the resistance to breakdown is raised. Moreover, this dielectric may serve for accurately determining the distance between the parts of the hollow wave guide to be joined.

The interruption plane is preferably at an angle of 90+20° to the axis of the hollow wave guide. If at least along part of the interruption plane a dielectric other than air is available, it is efficacious for this angle to be chosen so that the angle is neither greater not smaller than the limit value for sliding off from the oblique face. In this event, if the hollow wave guide is arranged horizontally, the joint can be held in the vertical direction without the use of further supporting or securing members acting in the vertical direction only with the aid of a lateral guide, and one part of the hollow wave guide can readily be separated from the other by lifting it. When a detachable intermediate piece must be arranged between two stationary parts, the flanges are arranged to extend obliquely in opposite directions with respect to the axis of the hollow wave guide.

However, the relative positions of the parts may also be fixed by means of an additional holding device constituted, for example, by supports having snap locks. This is particularly favourable when the dielectric at the interruption place consists of air.

As already stated, only a very small quantity of the high-frequency energy emanates from the hollow wave guide at the interruption place; in order to avoid, for example, a disturbance of sensitive measuring devices, this small quantity of energy may advantageously be rendered harmless in that the interruption place is covered on the outer side with a material damping high-frequency energy such as graphite or ferrite.

If higher quantities of energy are supplied to the hollow wave guide, it is advantageous to provide an electric protective switch which switches the high-frequency generator out of circuit upon the opening of the joint and thus prevents that energy is radiated at the formed aperture which gives rise to damage, for example, injures the operating staff.

For the sake of completeness, it is pointed out that the quick-closing joint according to the invention cannot be compared with the known joints of hollow wave guides which can be established by means of so-called λ/4 closures and are used, for example, as shock-free rotary couplings in round hollow wave guides. Such λ/4 closures constitute pronounced resonant circuits and have only a very small bandwidth. On the contrary, the joint for a hollow wave guide according to the invention does not exhibit frequency-dependent properties, but constitutes an aperiodical circuit arrangement which is based on another physical principle.

The invention will now be described more fully with reference to the accompanying drawing which shows a few embodiments.

Figure 1:
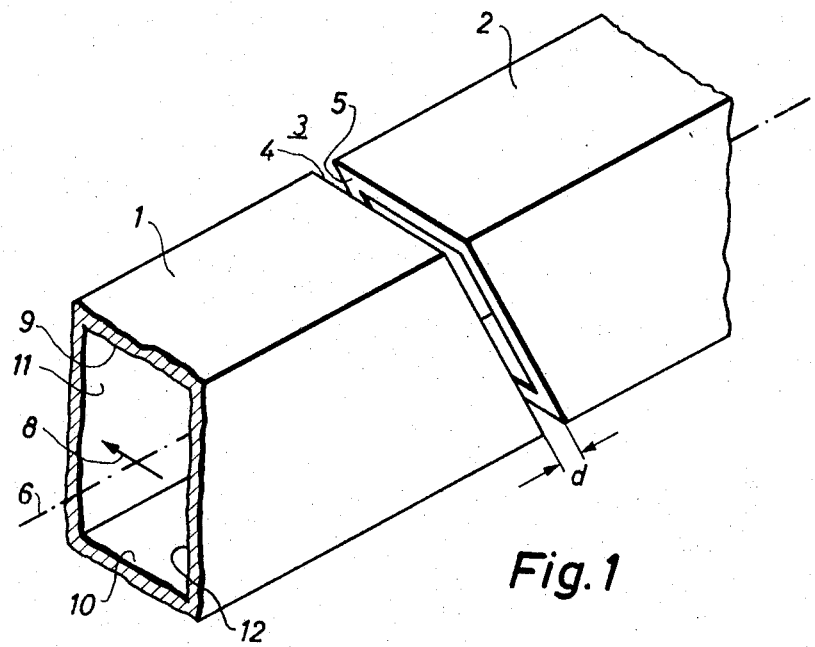
FIG. 1 is a diagrammatic perspective view of a hollow wave guide having a joint according to the invention.
Figure 2:
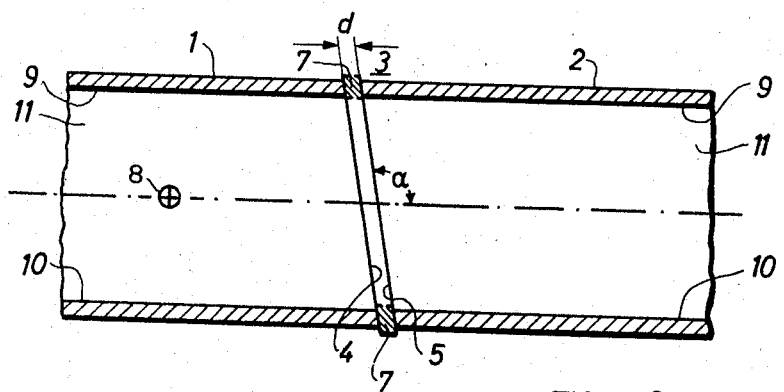
FIG. 2 is a vertical section of the axis of the hollow wave guide shown in FIG. 1.

In FIGS. 1 and 2, the parts 1 and 2 constitute a hollow wave guide provided with a quick-closing joint 3 consisting of the end faces 4 and 5 facing each other. At the interruption place, these faces are spaced apart by a distance $d$ and are at an angle $\alpha$ to the axis 6 of the hollow wave guide. FIG. 2 shows in dotted lines that a foil 7 having a thickness $d$ is disposed between the faces 4 and 5 in the interruption plane separating the parts 1 and 2 of the hollow wave guide from each other. The foil is cut out inside the hollow wave guide in the form of a frame in order to avoid disturbance of the high-frequency wave produced in the hollow wave guide. The parts 1 and 2 are held in the relative positions by mechanical means (not shown).

In this embodiment, the hollow wave guide is proportioned so that the latter oscillates in the $H_{10}$ mode at the wave length of the high-frequency wave produced. The interruption plane between the parts of the hollow wave guide extends in the direction of the electric field vector which is indicated with an arrow 8 and which extends parallel to the narrow sides 9 and 10 of the hollow wave guide 1, 2 and at right angles to the broad sides 11 and 12 of the hollow wave guide. The angle $\alpha$ between the interruption plane and the axis of the hollow wave guide is preferably chosen to lie between $90\pm5°$ and $90\pm20°$.

Figure 3:
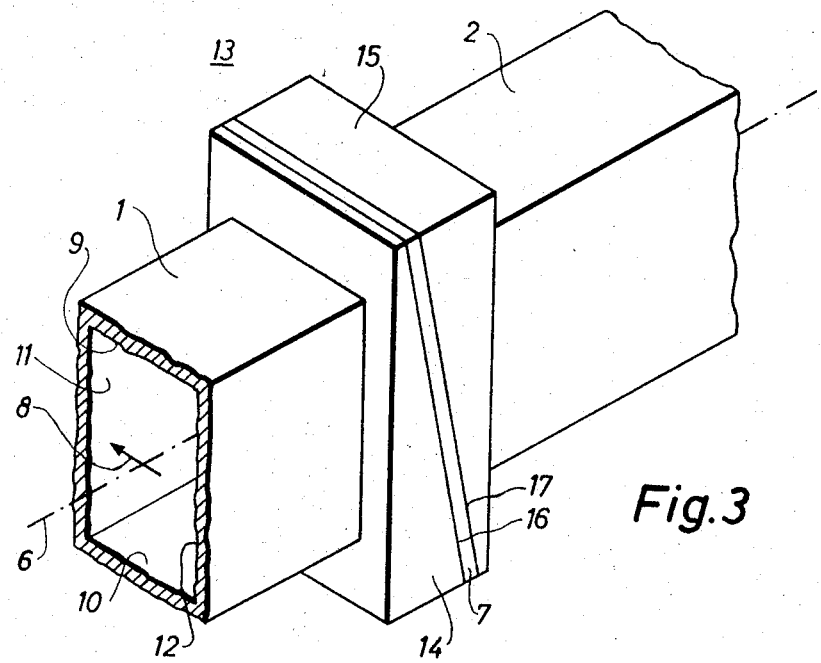
FIGS. 3 and 4 are a perspective view and a vertical sectional view, respectively of a hollow wave guide the joint of which comprises two flanges.
Figure 4:
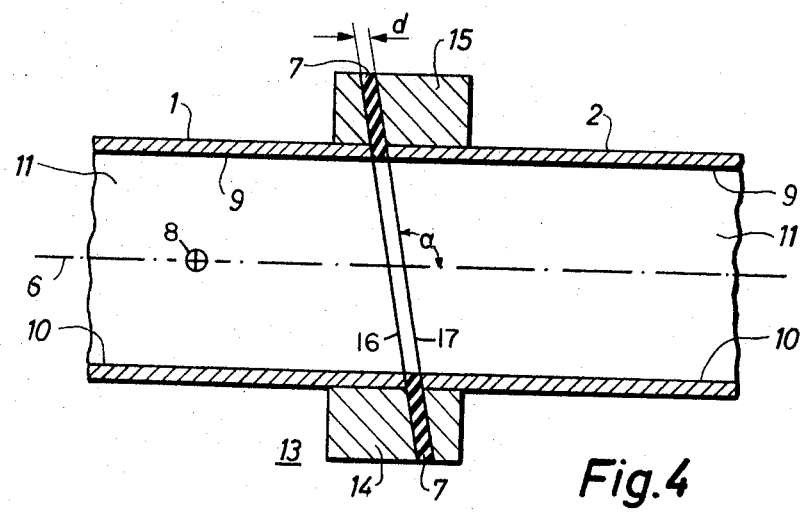

In the arrangement shown in FIGS. 3 and 4, the parts 1 and 2 of the hollow wave guide are provided with a quick-closing joint 13, in which case use is made of flange-shaped parts 14 and 15. The flat faces 16 and 17 of these parts facing each other are parallel to each other and at an angle $\alpha$ to the axis of the hollow wave guide. As is the case in the embodiment shown in FIG. 2, a foil 7 of dielectric low-loss material having a thickness $d$ may be disposed between the faces facing each other. The interruption plane extends in the direction of the electric field vector 8.

Figure 5:
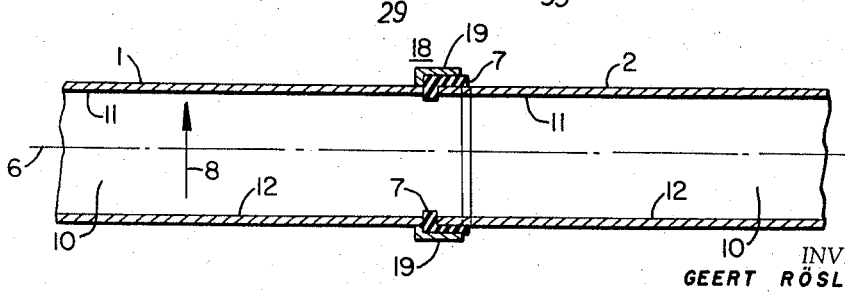
FIG. 5 is a sectional view of another embodiment.

FIG. 5 is a section of the axis 6 of the hollow wave guide parallel to the narrow sides 9 and 10 of the two guide parts 1 and 2. At the interruption place between the parts 1 and 2 of the hollow wave guide, the part 1 supports the rectangularly bent frames 18 which are secured to the faces 11 and 12 and the free ends 19 of which overlap the interruption place and partly overlap the part 2 of the hollow wave guide. The intermediate space at the interruption place is filled with a di-electric material 7 having a low loss factor. The joint is established by slipping one part into the other. It is also possible, however, to provide a frame on the narrow side of one part, for example, part 1, of the hollow wave guide, which part has likewise frames on its broad sides, and to join the frame to the other opposite narrow side of the other part of the hollow wave guide, for example, of the part 2. Consequently, the guide parts may be joined or separated by displacing them along one another.

Figure 6:
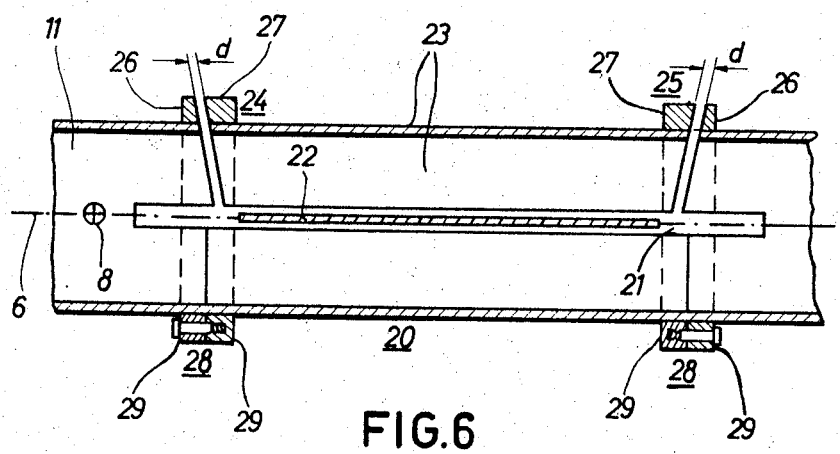
FIG. 6 is a sectional view of an embodiment in which a hollow wave guide for use in a high-frequency heating apparatus for thin tape-shaped material comprises two joints.

FIG. 6 shows a part of a hollow wave guide of a high-frequency heating apparatus for thin dielectric strips or tapes known per se. Over part of its length, the hollow wave guide 20 exhibits at the centre of the two broad sides 11 and 12 a longitudinal gap 21. The plane passing through the gaps 21 extends in the direction of the electric field vector 8 and passes through the axis 6 of the hollow wave guide. At the centre of the gaps 21, the tape 22 to be heated is passed through the hollow wave guide 20. As stated hereinbefore, two or more straight parts of a hollow wave guide may be arranged parallel to each other, which parts are joined to each other in a zigzag-wise manner by means of semi-circular connecting pieces, as a result of which a continuous wave guide is constituted which has a plurality of heating zones for the tape lying one behind the other.

The tape may be introduced into the gaps in a simple manner in that the upper part 23 of the hollow wave guide can be separated from the remaining part 20 of the hollow wave guide with the aid of two quick-closing joints 24 and 25. The interruption places of the closing areas 24 and 25 are directed in opposite senses obliquely outwards with respect to the axis 6 of the hollow wave guide. The flanges 26 and 27 surround the hollow wave guide as far as the gap 21.

The gaps at the interruption places may be filled with a low-loss dielectric material (not shown).

Figure 7:
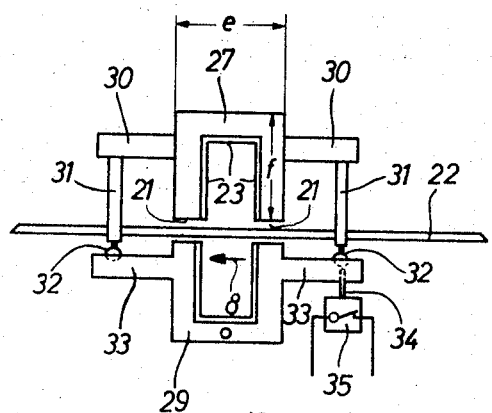
FIG. 7 shows a holding device for the upper part of the arrangement shown in FIG. 6.

The parts of the hollow wave guide arrangement shown in FIG. 6 may be held in the correct relative positions by the holding device shown in FIG. 7. FIG. 7 is the left-hand side elevation of the arrangement shown in FIG. 6. In laterally projecting arms 30, the flanges 27 of the detachable part 23 hold vertical supports 31 which bear by snap-locking members 32 on arms 33. These arms 33 are secured to the lower part of the hollow wave guide by means of a bracket 29. The distance between the parts of the hollow wave guide can be accurately adjusted by the length of the supports 31. The supports 31 are disposed laterally of the tape 22 and do not disturb the movement of the tape through the gaps 21.

The parts may be held, for example, with the aid of tightening means (not shown).

By means of one of the snap-lock members 32, a switch 35 is closed through a push-pin 34, which switch is connected to the switching-on current circuit of a high frequency generator supplying the high-frequency energy for heating. When the connecting piece is opened, the generator is switched out of circuit.

In an arrangement comprising a hollow wave guide as shown in FIGS. 6 and 7, use was made of a hollow wave guide having the internal dimensions 43.18 mms. x 86.36 mms. (R26 according to DIN 47302); the flange of the joint had the external dimensions (see FIG. 7) $e=95$ mms. and $f=66$ mms. The distance $d$ amounted to ½ mm. and the angle $\alpha$ was 97° and 83°, respectively. Table 1 indicates a few results of measurements at this hollow wave guide.

TABLE 1

| | Frequency, mc./s. | Transformation number k | Value loss factor (db) |
|---|---|---|---|
| Wave guide having one joint | 2400 to 2500 | ≤1.03 | <0.01 |
| Wave guide having two joints | 2400 to 2500 | ≤1.07 | 0.02 |

The transformation number $k$ indicates the ripple factor $s$ in case of a reflection-free closing of the guide.

Also when the system operates at full power (2 kw.), the joint proved to be reliable.

Table 2 indicates values of measurements obtained at a wave guide having a quick-closing joint shown in FIGS. 1 and 2. Use was made of the same rectangular wave guide as in the system described hereinbefore; the wall thickness thereof amounted to 2 mms. At a frequency of 2,450 mc./s., these measuring values were obtained for different angles $\alpha$ at the distances $d=0.5$ mm. and $d=1$ mm.

TABLE 2

| d (mm.) | $\alpha$(°) | Transformation number k | Value loss factor (db) |
|---|---|---|---|
| 0.5 | 100 | 1.03 | 0.14 |
| 1 | 100 | 1.05 | 0.22 |
| 0.5 | 110 | 1.03 | 0.15 |
| 0.5 | 135 | 1.03 | 0.09 |

It appears from Table 2 that the wave guide having this simple joint also exhibits small loss factors. At a value of the loss factor of, for example, 0.15 db, the quantity of lost energy is less than 4%, which also includes the damping losses of the wave guide itself.

The use of the joint according to the invention is not limited to the shape of the wave guide and the mode of oscillation of the wave guide described herein; the invention may also be used with, for example, round wave guides and other oscillation modes.

What is claimed is:

1. A wave guide consisting of at least two parts which may be joined in a detachable manner by means of a quick-closing joint, characterized in that the wave guide is interrupted at least partly in a plane having a direction which coincides with the electric field vector of the wave produced in the wave guide, the direction of said plane being at an angle to the axis of the wave guide which is greater than 0° and smaller than 180°, the distance between the parts of the wave guide at the place of interruption being as small as possible and sufficiently great to avoid flash-over.

2. A wave guide as claimed in claim 1, characterized in that at least along part of the circumference of the wave guide the external size of the wave guide in the interruption plane is at least 1/50 greater than its internal size.

3. A wave guide as claimed in claim 2, characterized in that said external size is at least ⅓ greater than said internal size.

4. A wave guide as claimed in claim 1, characterized in that screening members are provided at the interruption place at least along part of the circumference of the wave guide provision for preventing the high-frequency field from emanating from the internal part of the wave guide.

5. A wave guide as claimed in claim 4, characterized in that the parts of the wave guide at the interruption place along at least part of its circumference are provided with outwardly bent edges.

6. A wave guide as claimed in claim 4, characterized in that screening is provided along the edge of the aperture, said screening comprising a rectangularly bent frame having one limb secured to one part of the wave guide and a second limb overlapping the interruption place and partly overlapping the other part of the wave guide.

7. A wave giude as claimed in claim 1, characterized in that at the interruption place the parts of the hollow wave guide are separated from each other by a dielectric material other than air.

8. A wave guide as claimed in claim 1, characterized in that the distance between the parts of the wave guide at the interruption place is ≤0.5 mm.

9. A wave guide as claimed in claim 1, characterized in that the interruption plane is at an angle of 90±20° to the axis of the wave guide.

10. A wave guide as claimed in claim 1, characterized in that the interruption place is surrounded by a damping material for damping high-frequency energy.

11. A wave guide as claimed in claim 1, characterized in that one of said wave guide parts is a detachable intermediate piece separated at both ends from a stationary wave guide part by interruption planes, the ends of the intermediate piece being arranged to extend obliquely in opposite directions with respect to the longitudinal axis of the wave guide.

12. A wave guide as claimed in claim 11, characterized in that the wave guide has two longitudinally extending gaps, the connecting plane of said gaps passing through the longitudinal axis of the wave guide and extending in the direction of the electric field vector, and said detachable part is positioned over said gaps, said gaps forming longitudinal edges of said detachable part, whereby said detachable part can be joined by means of a quick-closing joint to said stationary part of the wave guide so as to form a unit.

13. A wave guide as claimed in claim 12, comprising support means positioned to hold said detachable part of the wave guide in a fixed position.

14. A wave guide as claimed in claim 11, characterized in that an electric protective switch is positioned to switch off the energy-supplying high-frequency generator upon the opening of said detachable part.

15. A wave guide system for providing a readily closeable joint between a pair of wave guide sections, comprising first and second wave guide sections having adjacent end portions, at least a part of said adjacent end portions being longitudinally spaced apart along a plane having a direction that coincides with the electric field vector of waves in said waveguide sections, said plane extending in a direction that has an angle greater than 0° and less than 180° to the longitudinal axis of said wave guide sections, the separation between said end portions being sufficiently small that no substantial amount of energy in said wave guide escapes therethrough, and said separation being sufficiently great that flash-over does not occur between said adjacent ends.

References Cited by the Examiner
UNITED STATES PATENTS

| | | | |
|---|---|---|---|
| 2,548,404 | 4/1951 | Sobel et al. | 333—98 |
| 2,560,903 | 7/1951 | Stiefel | 219—10.61 |
| 2,636,975 | 4/1953 | Baker | 219—10.61 |
| 2,637,776 | 5/1953 | Edson | 333—98 |
| 2,643,139 | 6/1953 | Hamilton | 333—98 |
| 2,662,302 | 12/1953 | Cunningham | 219—10.61 |
| 3,098,207 | 7/1963 | Gordon et al. | 333—98 |
| 3,210,699 | 10/1965 | Tagano | 333—98 |

FOREIGN PATENTS

| | | |
|---|---|---|
| 1,077,741 | 1/1957 | Germany. |
| 1,100,748 | 3/1961 | Germany. |

ELI LIEBERMAN, *Primary Examiner.*

HERMAN KARL SAALBACH, L. ALLAHUT,
*Assistant Examiners.*

UNITED STATES PATENT OFFICE
CERTIFICATE OF CORRECTION

Patent No. 3,315,186 April 18, 1967

Geert Rösler et al

It is hereby certified that error appears in the above numbered patent requiring correction and that the said Letters Patent should read as corrected below.

Column 1, line 35, for "know" read -- known --; column 3, line 15, for "90+20°" read -- 90±20° --; column 5, line 36, for "flange" read -- flanges --.

Signed and sealed this 14th day of November 1967.

(SEAL)
Attest:

Edward M. Fletcher, Jr.
Attesting Officer

EDWARD J. BRENNER
Commissioner of Patents